(12) United States Patent
Rozenbaum

(10) Patent No.: US 11,132,433 B1
(45) Date of Patent: Sep. 28, 2021

(54) DEVICE AND METHOD FOR INCREASING SECURITY OF A GESTURE BASED LOGIN

(71) Applicant: International Business Machines Corporation, Armonk, NY (US)

(72) Inventor: Nir Rozenbaum, Yoqneam Illit (IL)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/882,572

(22) Filed: May 25, 2020

(51) Int. Cl.
*G06F 21/36* (2013.01)
*G06F 3/0488* (2013.01)

(52) U.S. Cl.
CPC .......... *G06F 21/36* (2013.01); *G06F 3/04883* (2013.01)

(58) Field of Classification Search
CPC .............................. G06F 21/36; G06F 3/04883
See application file for complete search history.

(56) References Cited

FOREIGN PATENT DOCUMENTS

| | | |
|---|---|---|
| CN | 102968272 A | 3/2013 |
| KR | 101424655 B1 | 7/2014 |

*Primary Examiner* — Seth A Silverman
(74) *Attorney, Agent, or Firm* — G. E. Ehrlich

(57) ABSTRACT

A device, comprising at least one hardware processor adapted for allowing access to the device by: receiving, from a gesture sensor connected to the at least one hardware processor, a continuous input gesture, made by a user; identifying at least one part of the continuous input gesture not a member of a configured sequence of pattern gesture segments; identifying a match between the configured sequence of pattern gesture segments and a stripped input gesture produced by removing the at least one part of the continuous input gesture therefrom; and executing at least one software object by the at least one hardware processor subject to identifying the match, otherwise declining executing the at least one software object.

20 Claims, 6 Drawing Sheets ized device.
DEVICE AND METHOD FOR INCREASING SECURITY OF A GESTURE BASED LOGIN

BACKGROUND

Some embodiments described in the present disclosure relate to controlling access to a computerized device and, more specifically, but not exclusively, to gesture based control of access to the computerized device.

For brevity, henceforth the term "device" is used to mean "computerized device" and the terms are used interchangeably.

It is common practice to lock computerized devices, i.e. condition a user's access to input and output of the device subject to providing appropriate credentials. Some common lock methods include use of an alpha-numeric password or Personal Information Number (PIN), where the user enters the password or PIN using an input component of the device and access to the device is granted subject to the device confirming a match between the password and the user's account password, or between the PIN and a preconfigured PIN of the device.

As used herein, a touch screen is a component of a device for input and output, and is normally layered on the top of an electronic visual display of the device. For brevity, henceforth the term "display" is used to mean "an electronic visual display", and the terms are used interchangeably. A user can give input to the device by touching the touch screen in one or more simple gestures and additionally or alternatively in one or more multi-touch gestures, using a pointing object, for example a stylus or one or more fingers. A simple gesture is a gesture that comprises one point of contact at a time with the touch screen. Some examples of a simple gesture are a tap and a swipe, where a stylus or a finger are moved while touching the touch screen. A multi-touch gesture is a gesture that comprises two or more points of contact at a time with the touch screen. Some examples of a multi-touch gesture are a pinch and simultaneously touching a shift key and another key of a virtual keyboard displayed on a device's display.

With the advent use of touch screens, for example in laptop computers and in mobile devices such as smart phones and tablet computers, it has become common practice to use a pattern based lock, where a user must slide a finger or pointing object over the device's screen in a gesture, and access to the device is granted subject to the gesture matching a preconfigured pattern.

SUMMARY

It is an object of the present disclosure to describe a device and a method for controlling access to a computerized device.

The foregoing and other objects are achieved by the features of the independent claims. Further implementation forms are apparent from the dependent claims, the description and the figures.

According to a first aspect of the invention, a device comprises at least one hardware processor adapted for: allowing access to the device by: receiving, from a gesture sensor connected to the at least one hardware processor, a continuous input gesture, made by a user; identifying at least one part of the continuous input gesture not a member of a configured sequence of pattern gesture segments; identifying a match between the configured sequence of pattern gesture segments and a stripped input gesture produced by removing the at least one part of the continuous input gesture therefrom; and executing at least one software object by the at least one hardware processor subject to identifying the match, otherwise declining executing the at least one software object.

According to a second aspect of the invention, a method for allowing access to a device is by: receiving, from a gesture sensor, a continuous input gesture, made by a user; identifying at least one part of the continuous input gesture not a member of a configured sequence of pattern gesture segments; identifying a match between the configured sequence of pattern gesture segments and a stripped input gesture produced by removing the at least one part of the continuous input gesture therefrom; and executing at least one software object subject to identifying the match, otherwise declining executing the at least one software object.

According to a third aspect of the invention, a mobile computing device comprises at least one hardware processor adapted for: allowing access to the device by: receiving, from a touchscreen connected to the at least one hardware processor, a continuous input gesture, made by a user; identifying at least one part of the continuous input gesture not a member of a configured sequence of pattern gesture segments; identifying a match between the configured sequence of pattern gesture segments and a stripped input gesture produced by removing the at least one part of the continuous input gesture therefrom; and executing a graphical user interface by the at least one hardware processor subject to identifying the match, otherwise declining executing the graphical user interface; and subject to executing the graphical user interface: receiving at least one user selection, made by the user, via the graphical user interface; and executing at least one software object by the at least one hardware processor according to the at least one user selection.

In an implementation form of the first and second aspects, the at least one part of the continuous input gesture comprises a first gesture segment; and the continuous input gesture comprises the configured sequence of pattern gesture segments, in contiguous order, and the first gesture segment immediately before the configured sequence of pattern gesture segments. Optionally, the at least one part of the continuous input gesture comprises a second gesture segment, and the continuous input gesture comprises the configured sequence of pattern gesture segments, in contiguous order, and the second gesture segment immediately after the configured sequence of pattern gesture segments. Optionally, the at least one part of the continuous input gesture comprises at least one pair of input gesture segments comprising a third gesture segment and a fourth gesture segment, and the continuous input gesture comprises the configured sequence of pattern gesture segments, in contiguous order, and the third gesture segment immediately before the configured sequence of pattern gesture segments and the fourth gesture segment immediately after the configured sequence of pattern gesture segments. Optionally, the at least one part of the continuous input gesture comprises at least one fifth gesture segment. Optionally, the configured sequence of pattern gesture segments comprises at least one pair of pattern gesture segments comprising a first configured gesture segment and a second configured gesture segment immediately consecutive thereto, and for each fifth gesture segment of the at least one fifth gesture segments and one pair of the at least one pair of pattern gesture segments, the continuous input gesture comprises the fifth gesture segment immediately following the first configured gesture segment, and immediately followed by the consecutive second configured gesture. Allowing the one or more gesture segments of the continuous input gesture not members of the configured sequence of pattern gesture segments to be in one or more positions in relation to the configured sequence of pattern gesture segments allows increasing a length of the continuous input gesture without increasing a likelihood of the user failing to remember the preconfigured pattern as the user does not need to remember the one or more gesture segments, thus increasing usability of the device. In addition, the one or more gesture segments wipe smudge marks on a touch screen, and thus reduce a likelihood of the other person identifying the configured sequence of pattern gesture segments observing smudge marks on a touch screen.

In another implementation form of the first and second aspects, the gesture sensor is selected from a group of sensors consisting of: a tactile sensor, a touch screen, a touchpad, a pressure sensor, an accelerometer, a camera, a sound sensor, and a microphone. Optionally, the continuous input gesture is selected from a group of gestures consisting of: a pattern of an object traversing a two-dimensional plane, a pattern of the object traversing a three-dimensional space, a pattern of a body part traversing the two-dimensional plane, a pattern of at least one body part traversing the three-dimensional space, a sequence of words, and a sequence of syllables. Optionally, the body part is one of: a part of an eye, a finger, a hand, and a foot. Optionally, the at least one body part comprises at least one of: an iris of an eye, a finger, a hand, an arm, a foot, a leg, a head, and a torso. Optionally, the object is selected from a group of objects consisting of: a stylus, a pen, and a device comprising an accelerometer. Using one of the group of sensors listed above increases usability of the device by facilitating use of one of the group of gestures, for example allowing voice based access control for use by users unable to move a body part.

In another implementation form of the first and second aspects, the at least one hardware processor is adapted for allowing access to the device further by: receiving from the gesture sensor another continuous input gesture, made by another user; identifying at least one other part of the continuous input gesture not a member of the configured sequence of pattern gesture segments; identifying another match between the configured sequence of pattern gesture segments and another stripped input gesture produced by removing the at least one other part of the other continuous input gesture therefrom; executing the at least one software object by the at least one hardware processor subject to identifying the other match, otherwise declining executing the at least one software object. Optionally, the at least one other part of the other continuous input gesture comprises another first gesture segment, and the other continuous input gesture comprises the configured sequence of pattern gesture segments, in contiguous order, and the other first gesture segment immediately before the configured sequence of pattern gesture segments. Optionally, the at least one other part of the other continuous input gesture comprises another second gesture segment, and the other continuous input gesture comprises the configured sequence of pattern gesture segments, in contiguous order and the other second gesture segment immediately after the configured sequence of pattern gesture segments. Optionally, the at least one other part of the other continuous input gesture comprises at least one other pair of input gesture segments comprising another third gesture segment and another fourth gesture segment, and the other continuous input gesture comprises the configured sequence of pattern gesture segments, in contiguous order and the other third gesture segment immediately before the configured sequence of pattern gesture segments and the other fourth gesture segment immediately after the configured sequence of pattern gesture segments. Optionally, the at least one other part of the other continuous input gesture comprises at least one other fifth gesture segment, and the configured sequence of pattern gesture segments comprises at least one pair of pattern gesture segments, each comprising a first configured gesture segment and a second configured gesture segment immediately consecutive thereto and for each other fifth gesture segment of the at least one other fifth gesture segments and one pair of the at least one pair of pattern gesture segments, the other continuous input gesture comprises the other fifth gesture segment immediately following the respective first configured gesture segment, and immediately followed by the respective consecutive second configured gesture. Using other one or more gesture segments increases security of the device by reducing a likelihood of another person learning the gesture by observing the user, as the user may perform a different continuous input gesture each time they unlock the device. In addition, Using the other one or more gesture segments increases security of the device by reducing a likelihood of the other person learning the gesture by observing the user as the user may perform a different continuous input gesture each time they unlock the device.

In another implementation form of the first and second aspects, executing the at least one software object comprises executing a graphical user interface for accepting input from the user. Executing the graphical user interface subject to the match increases security of the device.

In another implementation form of the first and second aspects, identifying the at least one part of the continuous input gesture not a member of a configured sequence of pattern gesture segments is after receiving the continuous input gesture. Identifying the at least one part of the continuous input gesture after receiving the continuous input gesture increases security of the device by reducing a likelihood of the other person distinguishing between the configured sequence of pattern segments and the one or more pattern gesture segments not members of the configured sequence of pattern segments.

In another implementation form of the first and second aspects, the at least one hardware processor is further adapted for receiving from a user, via at least one input component connected to the at least one hardware processor, the configured sequence of pattern gesture segments and at least one position, in the configured sequence of pattern gesture segments, of an allowed part of the continuous input gesture segments not a member of the configured sequence of pattern gesture segments. Configuring the at least one position increases security of the device by allowing the user to change at least one pattern gesture segments so long as the at least one pattern gesture segment is made at the at least one position, thus reducing a likelihood of the other user identifying the configured sequence of pattern gesture segments.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

In the drawings.

DETAILED DESCRIPTION

Figure 1:
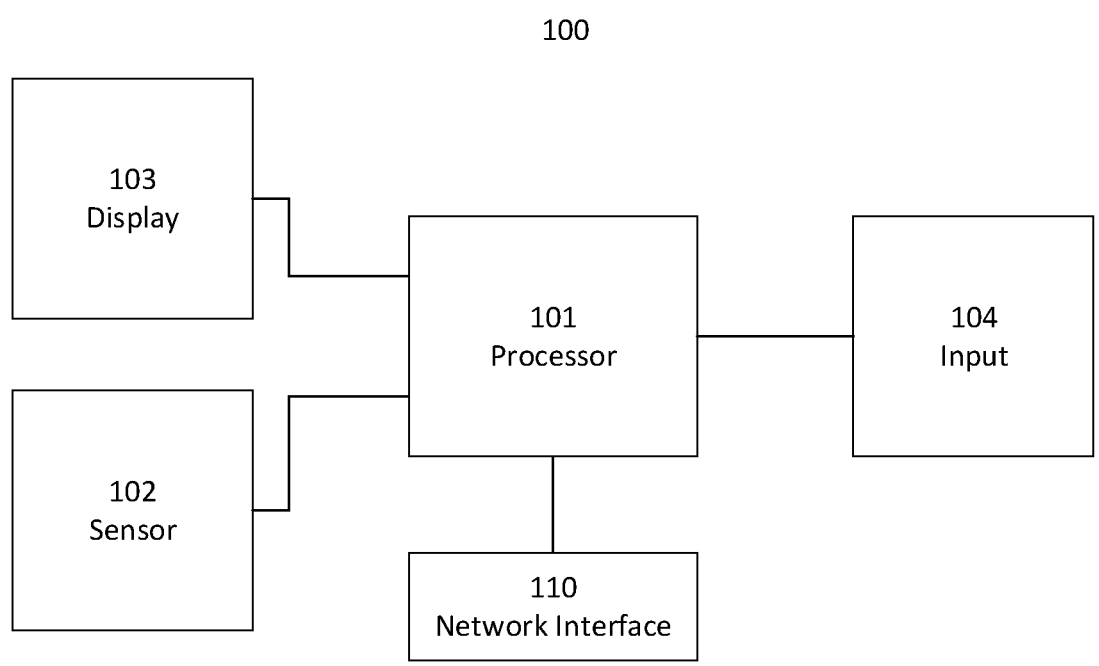
FIG. 1 is a schematic block diagram of an exemplary device, according to some embodiments.

Some embodiments described in the present disclosure relate to controlling access to a computerized device and, more specifically, but not exclusively, to gesture based control of access to the computerized device.

The term "unlocking a device" refers to granting access to the device's input and output, optionally for the purpose of controlling operation of the device. The present disclosure focuses on touch based gestures for unlocking a device, however other embodiments of the methods and devices described below may use other types of gestures, some examples being movement in a three-dimensional space and a sound. For example, unlocking the device may comprise a camera capturing movement of an object in a three-dimensional space. The camera may be integrated in the device or connected to the device. The object may be a body part, for example a part of an eye (for example an iris or a pupil or both), a finger or a hand. Other examples of a body part include an arm, a foot, a leg, a head, and a torso. The object may have a color and additionally a shape identifiable by the device in one or more images captured by the camera, for example a red object or a round object. Thus, in an example, the user may unlock the device by moving their hand in front of the camera in an identified pattern. In another example, the device may be connected to another device moved by the user, where the other device comprises an accelerometer. The user may unlock the device by moving the other device in the identified pattern in a two-dimensional plane or a three-dimensional space.

When a device is unlocked using a gesture, another person may be able to learn the gesture by observing a user unlocking the device. The other person may be able to repeat the gesture to unlock the device and thus gain unauthorized access to the device. In addition, when unlocking the device comprises touching a touch screen, the other person may be able to learn the pattern by examining oily smudge marks left on the touch screen by the pointing object, specifically but not exclusively the user's finger, when unlocking the device.

An existing practice to reduce a likelihood of the other person being able to repeat the gesture by observing the user is to use a long gesture. However, using a long gesture increases a likelihood of the user themselves failing to gain access to the device, due to increased likelihood of making a mistake when performing the gesture or of forgetting the correct gesture.

There exist methods for mitigating a risk of an unauthorized person learning a pattern by observing the smudge marks that comprise forcing the user to wipe the screen after entering the gesture to unlock the device and before accessing the device. Some existing methods display a plurality of points on the display and the user must touch each of the plurality of points before being granted access to the device. Such methods do not protect the user from being observed by the other person. Additionally, such methods require the user to perform additional gestures, to wipe the screen, even when unlocking the device in a safe environment, for example when alone.

There exist other methods using one or more gestures to control access to the device comprising changing an orientation of the gesture each time the user attempts to unlock the device, and additionally or alternatively changing an origin of the gesture on the touch screen each time the user attempts to unlock the device. In such methods, to unlock the device at a given attempt the user must enter the gesture according to the origin and orientation generated by the device for the given attempt. Such methods make it more difficult for the other person to learn the pattern by observing the user unlocking the device, however realigning the gesture according to varying origin, orientation, or both, is confusing for the user, thus increasing a likelihood of the user failing to gain access to the device.

There exist yet other methods using one or more gestures to control access to the device comprising generation of a random verification pattern, after entering the gesture, which the user has to trace in order to gain access to the device. In such methods, the gesture to unlock the device is separate from the gesture for verification, and thus the other person may still learn the pattern by observing the user unlocking the device as the separation may be observed as well. In addition, such methods require the user to enter the verification pattern also in a safe environment.

The present disclosure, in some embodiments described therein, proposes defining the preconfigured pattern for unlocking the device as a configured sequence of pattern gesture segments, and allowing the user to insert one or more dummy gesture segments in an input gesture provided for the purpose of unlocking the device. Thus, in such embodiments, to unlock the device the user makes a continuous input gesture comprising the configured sequence of pattern gesture segments, and optionally one or more dummy gesture segments. Optionally the one or more dummy gesture segments are arbitrary and variable, such that one or more dummy gesture segments used by the user in one attempt to unlock the device are different from other one or more dummy gesture segments used by the user in another attempt to unlock the device. The one or more dummy gesture segments may be in the continuous input gesture before the configured sequence of pattern gesture segments, after the configured sequence of pattern gesture segments, between two pattern gesture segments of the configured sequence of pattern gesture segments, or any combination of the above. Optionally, defining the preconfigured pattern comprises defining where the one or more dummy gesture segments may be in the continuous input gesture with relation to the configured sequence of pattern gesture segments. Optionally, one or more parts of the continuous input gesture not members of the configured sequence of pattern gesture segments are identified and removed from the continuous input gesture, resulting in a stripped input gesture. Optionally, access to the device is granted subject to identifying a match between the stripped input gesture and the configured sequence of pattern gesture segments. Optionally, granting access to the device comprises executing one or more software objects, for example a graphical user interface of the device, allowing the device to receive one or more selections made by the user and controlling execution of one or more other software objects, for example one or more mobile applications, according to the one or more selections made by the user.

Using a continuous input gesture obscures a distinction between the preconfigured pattern and the one or more dummy gesture segments, reducing a likelihood of the other person learning the preconfigured pattern by observing the continuous input gesture, thus increasing security of the device. Using arbitrary and variable one or more dummy gesture segments allows increasing a length of the input gesture without increasing a likelihood of the user failing to remember the preconfigured pattern as the user does not need to remember the one or more dummy gestures, thus increasing usability of the device. In addition, using arbitrary and variable one or more dummy gesture segments increases security of the device by reducing a likelihood of the other person learning the gesture by observing the user as the user may perform a different continuous input gesture each time they unlock the device. In addition, the one or more dummy gestures wipe smudge marks on a touch screen, and thus using arbitrary and variable one or more dummy gestures reduces a likelihood of the other person identifying the preconfigured pattern by observing smudge marks on a touch screen. In addition, as the one or more dummy gesture segments are optional, a user may use a continuous input gesture with no dummy gesture segments, for example when in a safe environment, thus increasing usability of the device.

Optionally, identifying the one or more parts of the continuous input gesture not members of the configured sequence of pattern gesture segments is after receiving the continuous input gesture. Thus, when defining the preconfigured pattern comprises defining that at least one dummy segment is allowed after the configured sequence of pattern gesture segments, the other person may not be able to learn the preconfigured pattern by observing a beginning of the input gesture as the device will not be unlocked until after the entire continuous input gesture is entered.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Henceforth, for brevity the term "processing unit" is used to mean "at least one hardware processor".

Reference is now made to FIG. 1, showing a schematic block diagram of an exemplary device 100, according to some embodiments. Some examples of a device are a mobile device, for example a mobile phone or a tablet computer. Other examples of a device are a computer, a laptop computer and a gaming consol. In such embodiments, processing unit 101 is connected to gesture sensor 102, for example a touch screen or a touch pad. Optionally, processing unit 101 is connected to more than one gesture sensor. Another example of a gesture sensor is another tactile sensor, for example a pressure sensor or a thermal sensor. Some other possible examples of a gesture sensor are an accelerometer, a camera, a sound sensor and a microphone. Optionally, processing unit 101 is connected to one or more display 103, optionally for the purpose of displaying a graphical user interface (GUI) of device 100. Some examples of a display are a screen component of a device and a monitor. Optionally, gesture sensor 102 is installed over display 103, for example when display 103 is a screen of a mobile device and gesture sensor 103 is a touch screen. Optionally, processing unit 101 is connected to one or more input components 104, optionally for the purpose of receiving input from a user. Optionally, one or more input components 104 comprise sensor 102, i.e. sensor 102 may be used not only to unlock access to device 100 but additionally to receive input from a user, for example for the purpose of controlling operation of device 100. Optionally, processing unit 101 is connected to one or more digital communication network interface 110, optionally for the purpose of communicating with another processing unit, optionally for the purpose of unlocking access to device 100. Optionally, one or more digital communication network interface 110 is connected to a Local Area Network, some examples being a Wi-Fi network and an Ethernet network. Optionally, one or more digital communication network interface 110 is connected to a Wide Area Network, some examples being the Internet and a cellular network, for example a Global System for Mobile Communication (GSM) network.

To allow access to device 100, in some embodiments device 100 implements the following optional method.

Figure 2:
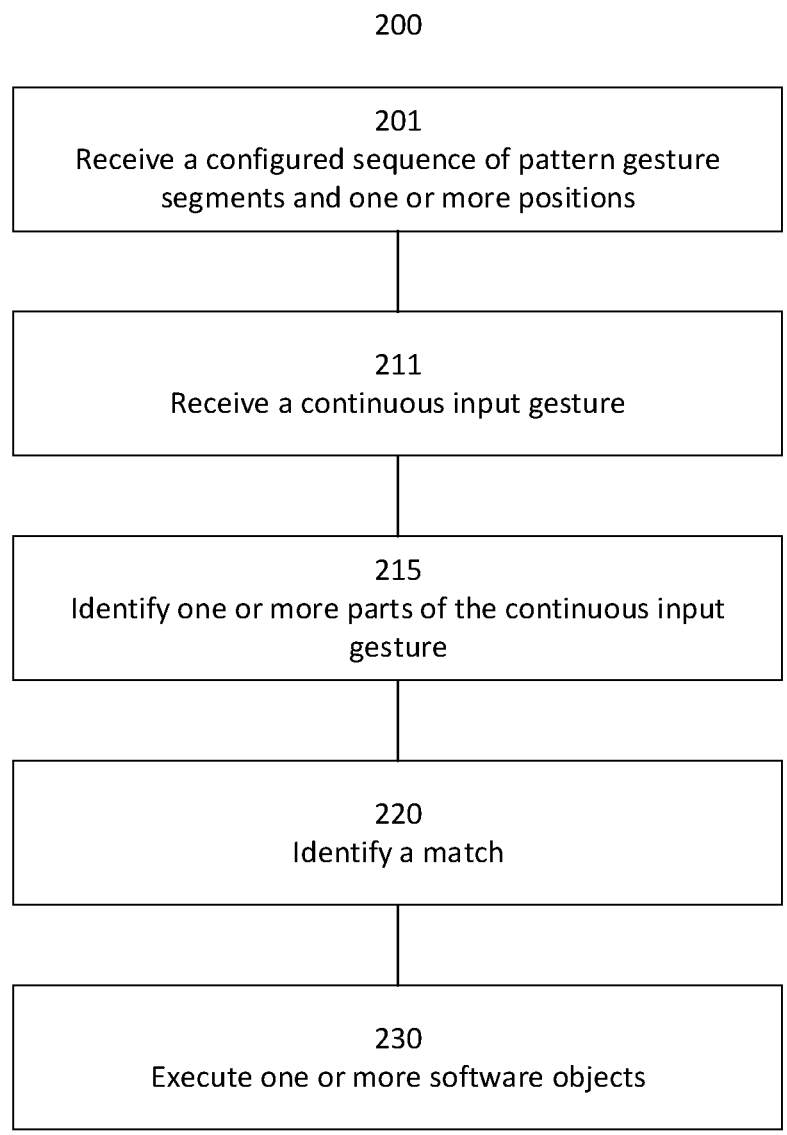
FIG. 2 is a flowchart schematically representing an optional flow of operations for allowing access to a device, according to some embodiments.

Reference is now made also to FIG. 2, showing a flowchart schematically representing an optional flow of operations 200 for allowing access to a device, according to some embodiments. In such embodiments, in 201 processing unit 101 receives from a user a sequence of pattern gesture segments.

Figure 3:
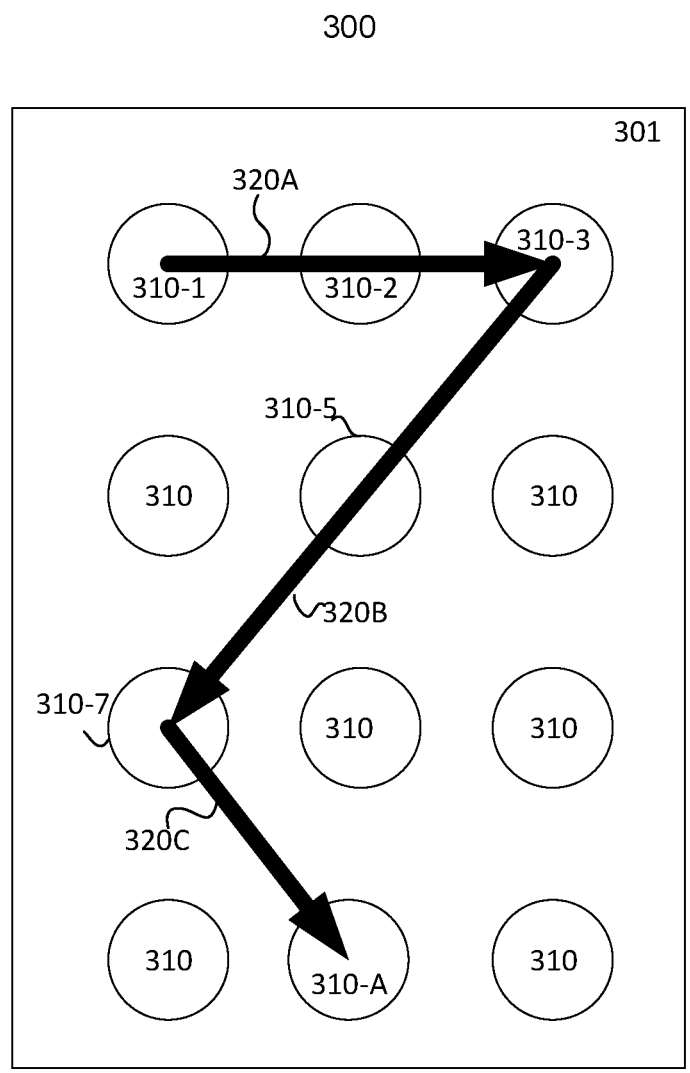
FIG. 3 is a schematic illustration of an exemplary configured pattern, according to some embodiments.

Reference is now made also to FIG. 3, showing a schematic illustration of an exemplary configured pattern 300, according to some embodiments. In such embodiments, configured pattern 300 is a configured sequence of pattern gesture segments comprising pattern segment 320A, pattern segment 320B and pattern segment 320C. For brevity, the term configured pattern 300 is used to mean configured sequence of pattern gesture segments 300 and the terms are used interchangeably.

Optionally, processing unit 101 receives the configured sequence of pattern gesture segments via one or more input component 104. Optionally, processing unit 101 receives the configured sequence of pattern gesture segments via gesture sensor 102. Optionally, processing unit 101 uses the configured sequence of pattern gesture segments for the purpose of allowing access to device 100. Optionally, processing unit 101 stores the configured sequence of pattern gesture segments in a non-volatile storage connected to processing unit 101, for example a flash memory card or an electrically erasable programmable read only memory (EEPROM) component of device 100 (not shown).

Optionally, the user enters the configured sequence of pattern gesture segments by moving an object on a two-dimensional plane 301, optionally plane 301 is a surface of gesture sensor 102. Optionally, the object is a body part, for example a finger. Optionally, the object is a stylus or a pen. Optionally, the object is a device comprising an accelerometer.

For simplicity, the following disclosure focuses on embodiments using a pattern in a two-dimensional plane. However, other embodiments may use other patterns. For example, the pattern may be in a three-dimensional space.

Optionally, the configured sequence of pattern gesture segments comprises an object traversing one or more points 310 identified on plane 301, collectively referred to as one or more points 310 and each individually referred to as point 310. Optionally one or more point 310 comprise point 310-1, point 310-2, point 310-3, point 310-5, point 310-7 and point 310-A. Optionally, the configured sequence of pattern gesture segments comprises a first segment of traversing from point 310-1 to point 310-2, a second segment of traversing from point 310-2 to point 310-3, a third segment of traversing from point 310-3 to point 310-5, a fourth segment of traversing from point 310-5 to point 310-7, and a fifth segment of traversing from point 310-7 to point 310-A.

Optionally, in 201 processing unit 101 additionally receives from the user one or more positions in the configured sequence of pattern gesture segments of an allowed part of an input gesture not a member of the configured sequence of pattern gesture segments. The one or more positions optionally comprise point 310-1 at a beginning of configured pattern 300, before first pattern gesture segment 320A. Optionally, the one or more positions comprise point 310-A at an end of configured pattern 300, after last pattern gesture segment 320C. Optionally, the one or more positions comprise point 310-3 between pattern gesture segment 320A and pattern gesture segment 320B. Optionally, the one or more positions comprise point 310-7 between pattern gesture segment 320B and pattern gesture segment 320C. The one or more positions may comprise any combination of points 310-1, 310-3, 310-7, and 310-A, and additionally or alternatively any one or more other points of one or more points 310.

Reference is now made again to FIG. 2. In 211, processing unit 101 optionally receives from gesture sensor 102 a continuous input gesture, made by a user. Optionally, the continuous input gesture is a pattern of an object traversing a two dimensional plane. For example, when gesture sensor 102 is a touch screen, the continuous input gesture may be captured by gesture sensor 102 capturing movement of a finger traversing plane 301 of gesture sensor 102. Optionally the object traversing the two-dimensional plane is a pen or a stylus. Optionally the object traversing the two-dimensional plane is another body part, for example a part of an eye, a foot or a hand, for example when gesture sensor 102 is a camera. The present disclosure focuses on embodiments using a pattern of an object traversing a two-dimensional plane, however in some other embodiments the continuous input gesture may be captured by gesture sensor 102 capturing movement of an object traversing a three-dimensional space, for example when the object is a device comprising an accelerometer, or when gesture sensor 102 is a camera. Optionally the object traversing the three-dimensional space is one or more body parts, some examples being a part of an eye, a finger, a hand, an arm, a foot, a let, a head, and a torso. For example, the pattern may comprise a hand moving in one direction and a foot moving in another. In another example the continuous input gesture may be a sequence of words or a sequence of syllables, for example when gesture sensor 102 is a microphone or another sound sensor. Optionally, the continuous input gesture is captured by gesture sensor 102 capturing movement of an object in a two-dimensional plane or a three-dimensional space, where the object is identified by a feature of the object. Some examples thereof include identifying the object by a shape of the object, by a size of the object, by a color of the object and by a type of the object, optionally using one or more object recognition methods.

Optionally, in 215 processing unit 101 identifies one or more parts of the continuous input gesture not members of configured sequence of pattern gesture segments 300.

Figure 4:
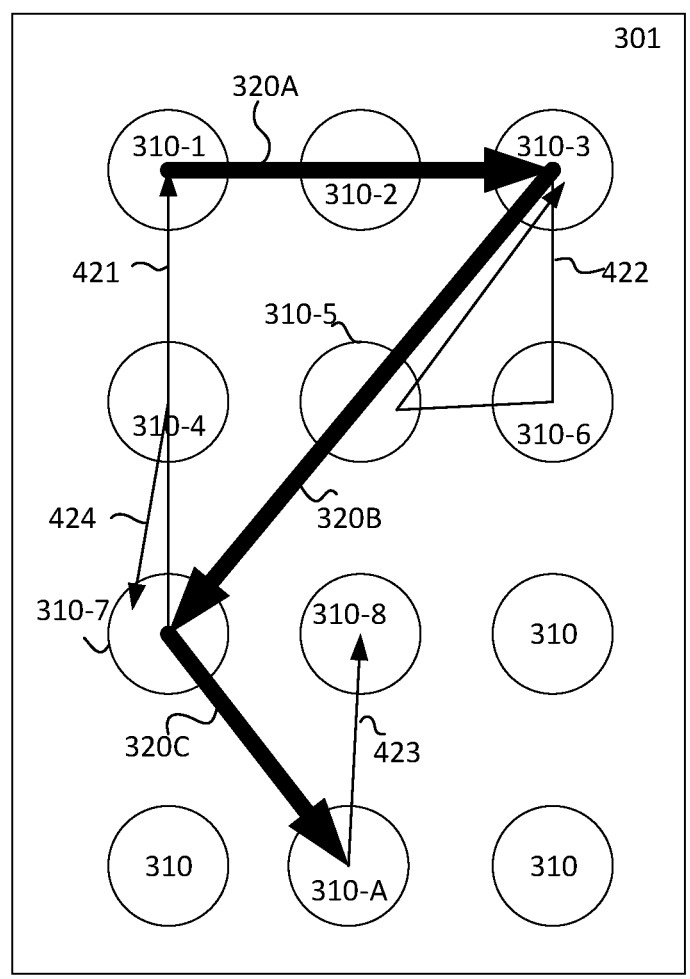
FIG. 4 is a schematic illustration of an exemplary input gesture, according to some embodiments.

Reference is now made also to FIG. 4, showing a schematic illustration of an exemplary input gesture 400, according to some embodiments. In such embodiments, part 421 is not a member of configured pattern 300. Optionally, the user makes continuous input gesture 400 comprising part 421, then pattern segment 320A, followed by pattern segment 320B, then followed by pattern segment 320C. Optionally, part 421 comprises the object traversing from point 310-4 of one or more points 310 to point 310-1. When making part 421 comprises ending at point 310-1, the user may make part 421 before making configured pattern 300 while preserving an order in configured pattern 300 of pattern segment 320A, pattern segment 320B and pattern segment 320B and keeping input gesture 400 continuous.

Optionally, part 422 is not a member of configured pattern 300 and comprises the object traversing from point 310-3 to point 310-6 of one or more points 310, then the object traversing from point 310-6 to point 310-5 and then the object traversing from point 310-5 to point 310-3. When making part 422 comprises starting from point 310-3 and ending at point 310-3, the user may insert part 422 into configured pattern 300 while preserving an order in configured pattern 300 of pattern segment 320A, pattern segment 320B and pattern segment 320B and keeping input gesture 400 continuous.

Optionally, part 424 is not a member of configured pattern 300 and comprises the object traversing from point 310-7 to point 310-4, then the object traversing from point 310-4 to point 310-7. When making part 424 comprises starting from point 310-7 and ending at point 310-7, the user may insert part 424 into configured pattern 300 while preserving an order in configured pattern 300 of pattern segment 320A, pattern segment 320B and pattern segment 320B and keeping input gesture 400 continuous.

Optionally, part 423 is not a member of configured pattern 300 and comprises the object traversing from point 310-A to point 310-8 of one or more points 310. When making part 423 comprises starting from point 310-A the user may make part 423 after making configured pattern 300 while preserving an order in configured pattern 300 of pattern segment 320A, pattern segment 320B and pattern segment 320B and keeping input gesture 400 continuous.

Continuous input gesture 400 may comprise one or more of part 421, part 422, part 423, and part 424, or any combination thereof. One or more parts 421, 422, 423, and 424 are dummy gesture segments with respect to configured pattern 300, optionally being part of continuous input gesture 400 while not being members of configured pattern 300.

Reference is now made again to FIG. 2. Optionally, processing unit 101 identifies one or more parts 421, 422, 423 and 424 after receiving continuous input gesture 400, specifically after receiving part 423 if exists. Optionally, processing unit 101 removes from input gesture 400 one or more parts 421, 422, 423 and 424 to produce a stripped input gesture. Optionally, processing unit 101 identifies one or more parts 421, 422, 423 and 424 at the one or more positions of an allowed part not in configured pattern 300. Optionally, processing unit 101 removes one or more parts 421, 422, 423, and 424 from continuous input gesture 400 subject to identifying one or more parts 421, 422, 423 and 424 at the one or more positions of an allowed part not in configured pattern 300. In 220, processing unit 101 optionally identifies a match between the stripped input gesture and configured pattern 300. Subject to identifying the match between the stripped input gesture and configured pattern 300, in 230 processing unit 101 optionally executes one or more software objects, for example a GUI of device 100, optionally for the purpose of accepting input from the user, for example for the purpose of executing one or more applications on device 100. Optionally, subject to failing to identify a match between the stripped input gesture and configured pattern 300, processing unit 101 declines executing the one or more software objects.

Optionally, 211, 215, 220 and 230 are executed more than once. Optionally, in 211 processing unit 101 receives from gesture sensor 102 another continuous input gesture, optionally made by another user. Optionally, the other user is the user that made the continuous input gesture, optionally making the other continuous input gesture at a new time, different from a time the user made the continuous input gesture.

Figure 5:
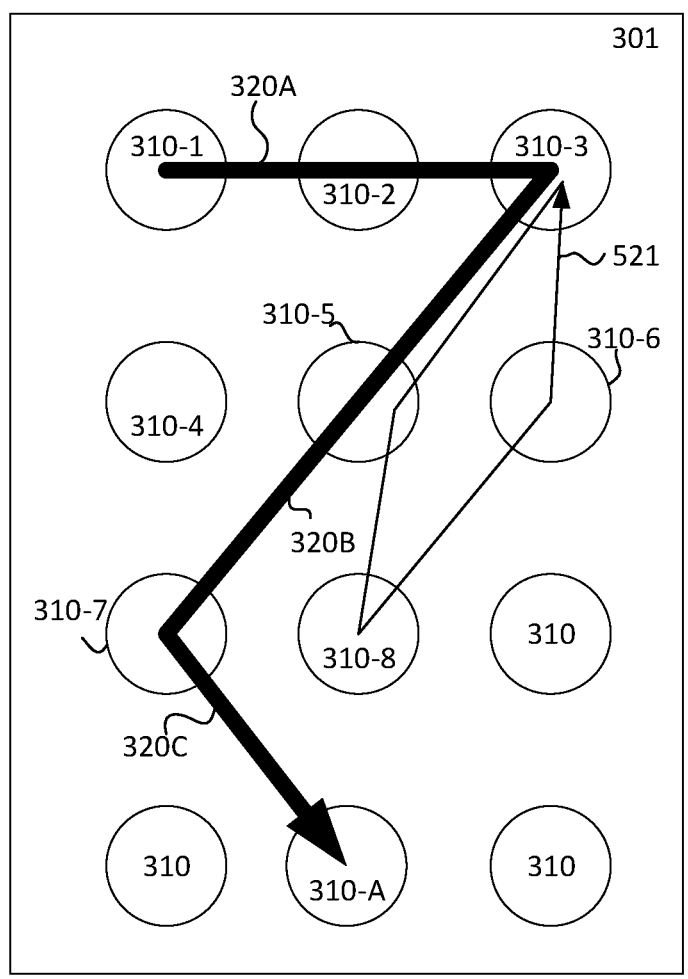
FIG. 5 is a schematic illustration of another exemplary input gesture, according to some embodiments.

Reference is now made also to FIG. 5, showing a schematic illustration of another exemplary input gesture 500, according to some embodiments. In such embodiments, other continuous input gesture 500 comprises part 521 not a member of configured pattern 300. Optionally, part 521 comprises the object traversing from point 310-3 to point 310-5, then the object traversing from point 310-5 to point 310-8 of one or more points 310, then the object traversing from point 310-8 to point 310-6 and then the object traversing from point 310-6 to point 310-3. When making part 521 comprises starting from point 310-3 and ending at point 310-3, the user may insert part 521 into configured pattern 300 while preserving an order in configured pattern 300 of pattern segment 320A, pattern segment 320B and pattern segment 320B and keeping other input gesture 500 continuous. It should be noted that even though both part 422 and part 521 may be inserted into configured pattern 300 at point 310-3, other continuous input gesture 500 is different from continuous input gesture 400 as part 521 is different from each of one or more parts 421, 422, 423 and 424 and any combination thereof. Optionally, other continuous input gesture 500 comprises one or more other parts not members of configured pattern 300, optionally made at one or more of point 310-0 and point 310-A.

Processing unit 101 optionally identifies part 521 in 215 when executed with other continuous input gesture 500. Optionally, processing unit 101 produces another stripped input gesture by removing part 521 from other continuous input gesture 500. Optionally, processing unit 101 identifies in 220, when executed with the other stripped input gesture, another match between the other stripped input gesture and configured pattern 300, and optionally in 230 executes the one or more software object subject to identifying the other match, otherwise declining to execute the one or more software object.

In some embodiments device 100 is a mobile device, for example a mobile phone having a touch screen. Optionally, device 100 implements the following method.

Figure 6:
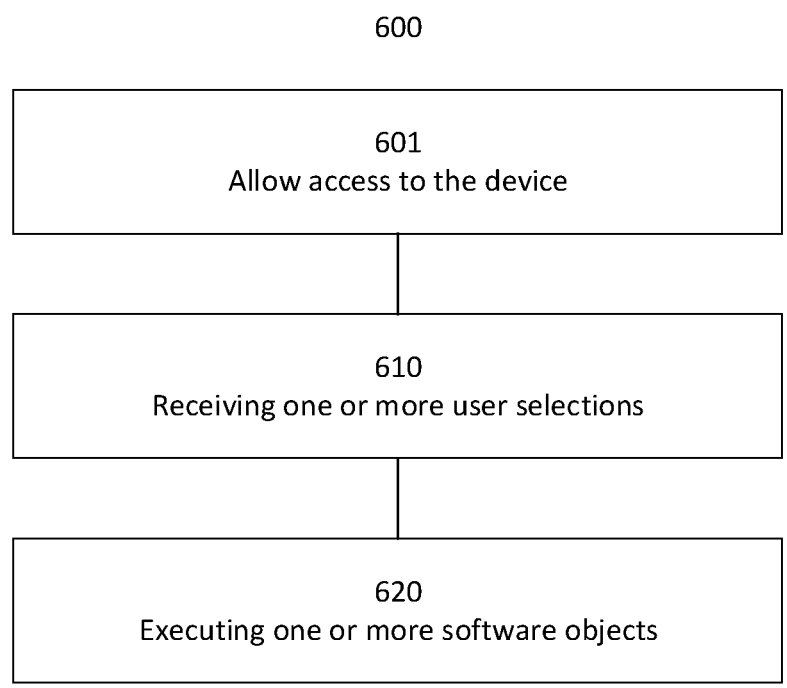
FIG. 6 is a flowchart schematically representing an optional flow of operations for a device, according to some embodiments.

Reference is now made also to FIG. 6, showing a flowchart schematically representing an optional flow of operations 600 for a device, according to some embodiments. In such embodiments, in 601 processing unit 101 allows access to device 100, optionally using method 200. Optionally, allowing access to device 100 comprises executing a GUI of device 100. In 610 processing unit 101 optionally receives one or more user selections via the GUI. Optionally, in 620 processing unit 101 executes one or more other software objects according to the one or more user selections. For example, when a user selects an application via the GUI, processing unit 101 may execute the application.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant gesture sensors will be developed and the scope of the term gesture sensor is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to embodiments. To the extent that section headings are used, they should not be construed as necessarily limiting.

What is claimed is:

1. A device, comprising at least one hardware processor adapted for allowing access to the device by:
   receiving, from a gesture sensor connected to the at least one hardware processor, a continuous input gesture, made by a user;
   identifying at least one part of the continuous input gesture not a member of a configured sequence of pattern gesture segments;
   identifying a match between the configured sequence of pattern gesture segments and a stripped input gesture produced by removing the at least one part of the continuous input gesture therefrom; and
   executing at least one software object by the at least one hardware processor subject to identifying the match, otherwise declining executing the at least one software object.

2. The device of claim 1,
   wherein the at least one part of the continuous input gesture comprises a first gesture segment; and
   wherein the continuous input gesture comprises:
      the configured sequence of pattern gesture segments, in contiguous order; and
      the first gesture segment immediately before the configured sequence of pattern gesture segments.

3. The device of claim 1,
   wherein the at least one part of the continuous input gesture comprises a second gesture segment; and
   wherein the continuous input gesture comprises:
      the configured sequence of pattern gesture segments, in contiguous order; and
      the second gesture segment immediately after the configured sequence of pattern gesture segments.

4. The device of claim 1,
   wherein the at least one part of the continuous input gesture comprises at least one pair of input gesture segments comprising a third gesture segment and a fourth gesture segment; and
   wherein the continuous input gesture comprises:
      the configured sequence of pattern gesture segments, in contiguous order; and
      the third gesture segment immediately before the configured sequence of pattern gesture segments and the fourth gesture segment immediately after the configured sequence of pattern gesture segments.

5. The device of claim 1,
   wherein the at least one part of the continuous input gesture comprises at least one fifth gesture segment;
   wherein the configured sequence of pattern gesture segments comprises at least one pair of pattern gesture segments comprising a first configured gesture segment and a second configured gesture segment immediately consecutive thereto; and
   wherein for each fifth gesture segment of the at least one fifth gesture segments and one pair of the at least one pair of pattern gesture segments, the continuous input gesture comprises the fifth gesture segment immediately following the first configured gesture segment, and immediately followed by the consecutive second configured gesture.

6. The device of claim 1, wherein the gesture sensor is selected from a group of sensors consisting of: a tactile sensor, a touch screen, a touchpad, a pressure sensor, an accelerometer, a camera, a sound sensor, and a microphone.

7. The device of claim 1, wherein the continuous input gesture is selected from a group of gestures consisting of: a pattern of an object traversing a two-dimensional plane, a pattern of the object traversing a three-dimensional space, a pattern of a body part traversing the two-dimensional plane, a pattern of at least one body part traversing the three-dimensional space, a sequence of words, and a sequence of syllables.

8. The device of claim 7, wherein the body part is one of: a part of an eye, a finger, a hand, and a foot.

9. The device of claim 7, wherein the at least one body part comprises at least one of: an iris of an eye, a finger, a hand, an arm, a foot, a leg, a head, and a torso.

10. The device of claim 7, wherein the object is selected from a group of objects consisting of: a stylus, a pen, and a device comprising an accelerometer.

11. The device of claim 1, wherein the at least one hardware processor is adapted for allowing access to the device further by:
    receiving from the gesture sensor another continuous input gesture, made by another user;
    identifying at least one other part of the continuous input gesture not a member of the configured sequence of pattern gesture segments;
    identifying another match between the configured sequence of pattern gesture segments and another stripped input gesture produced by removing the at least one other part of the other continuous input gesture therefrom;
    executing the at least one software object by the at least one hardware processor subject to identifying the other match, otherwise declining executing the at least one software object.

12. The device of claim 11,
    wherein the at least one other part of the other continuous input gesture comprises another first gesture segment; and
    wherein the other continuous input gesture comprises:
       the configured sequence of pattern gesture segments, in contiguous order; and
       the other first gesture segment immediately before the configured sequence of pattern gesture segments.

13. The device of claim 11,
wherein the at least one other part of the other continuous input gesture comprises another second gesture segment; and
wherein the other continuous input gesture comprises:
the configured sequence of pattern gesture segments, in contiguous order; and
the other second gesture segment immediately after the configured sequence of pattern gesture segments.

14. The device of claim 11,
wherein the at least one other part of the other continuous input gesture comprises at least one other pair of input gesture segments comprising another third gesture segment and another fourth gesture segment; and
wherein the other continuous input gesture comprises:
the configured sequence of pattern gesture segments, in contiguous order; and
the other third gesture segment immediately before the configured sequence of pattern gesture segments and the other fourth gesture segment immediately after the configured sequence of pattern gesture segments.

15. The device of claim 1,
wherein the at least one other part of the other continuous input gesture comprises at least one other fifth gesture segment;
wherein the configured sequence of pattern gesture segments comprises at least one pair of pattern gesture segments, each comprising a first configured gesture segment and a second configured gesture segment immediately consecutive thereto; and
wherein for each other fifth gesture segment of the at least one other fifth gesture segments and one pair of the at least one pair of pattern gesture segments, the other continuous input gesture comprises the other fifth gesture segment immediately following the respective first configured gesture segment, and immediately followed by the respective consecutive second configured gesture.

16. The device of claim 1, wherein executing the at least one software object comprises executing a graphical user interface for accepting input from the user.

17. The device of claim 1, wherein identifying the at least one part of the continuous input gesture not a member of a configured sequence of pattern gesture segments is after receiving the continuous input gesture.

18. The device of claim 1, wherein the at least one hardware processor is further adapted for:
receiving from a user, via at least one input component connected to the at least one hardware processor, the configured sequence of pattern gesture segments and at least one position, in the configured sequence of pattern gesture segments, of an allowed part of the continuous input gesture segments not a member of the configured sequence of pattern gesture segments.

19. A method for allowing access to a device by:
receiving, from a gesture sensor, a continuous input gesture, made by a user;
identifying at least one part of the continuous input gesture not a member of a configured sequence of pattern gesture segments;
identifying a match between the configured sequence of pattern gesture segments and a stripped input gesture produced by removing the at least one part of the continuous input gesture therefrom; and
executing at least one software object subject to identifying the match, otherwise declining executing the at least one software object.

20. A mobile computing device, comprising at least one hardware processor adapted for:
allowing access to the device by:
receiving, from a touchscreen connected to the at least one hardware processor, a continuous input gesture, made by a user;
identifying at least one part of the continuous input gesture not a member of a configured sequence of pattern gesture segments;
identifying a match between the configured sequence of pattern gesture segments and a stripped input gesture produced by removing the at least one part of the continuous input gesture therefrom; and
executing a graphical user interface by the at least one hardware processor subject to identifying the match, otherwise declining executing the graphical user interface; and
subject to executing the graphical user interface:
receiving at least one user selection, made by the user, via the graphical user interface; and
executing at least one software object by the at least one hardware processor according to the at least one user selection.

* * * * *